United States Patent [19]

Keeble

[11] Patent Number: 5,022,634

[45] Date of Patent: Jun. 11, 1991

[54] OPTICAL FIBRE INSTALLATION

[75] Inventor: Peter J. Keeble, Ipswich, England

[73] Assignee: British Telecommunications public limited company, United Kingdom

[21] Appl. No.: 399,533

[22] PCT Filed: Mar. 23, 1988

[86] PCT No.: PCT/GB88/00221

§ 371 Date: Aug. 21, 1989

§ 102(e) Date: Aug. 21, 1989

[87] PCT Pub. No.: WO88/07693

PCT Pub. Date: Oct. 6, 1988

[30] Foreign Application Priority Data

Mar. 23, 1987 [GB] United Kingdom ............... 8706803

[51] Int. Cl.$^5$ .............................................. B66F 3/24
[52] U.S. Cl. .................................................. 254/134.4
[58] Field of Search ................. 254/134.4, 134.3 FT, 254/134.3 R; 15/104.06 R; 268/25, 43, 178

[56] References Cited

U.S. PATENT DOCUMENTS

| | | |
|---|---|---|
| 3,610,582 | 10/1971 | Passoni . |
| 3,654,114 | 4/1972 | Brandstaetter . |
| 3,793,732 | 2/1974 | Hamrick . |
| 4,082,423 | 4/1978 | Glista et al. . |
| 4,105,284 | 8/1978 | Olshansky . |
| 4,181,403 | 1/1980 | Macedo et al. . |
| 4,185,809 | 1/1980 | Jonnes . |
| 4,230,395 | 10/1980 | Dean et al. . |
| 4,248,035 | 2/1981 | Skillen et al. . |
| 4,332,436 | 6/1982 | Adorni et al. . |
| 4,372,792 | 2/1983 | Dey et al. . |
| 4,408,378 | 10/1983 | Ketteringham . |
| 4,414,942 | 3/1979 | Anderson . |
| 4,446,686 | 5/1984 | Panuska et al. . |
| 4,552,433 | 11/1985 | Titchmarsh et al. . |
| 4,640,576 | 2/1987 | Eastwood . |
| 4,659,174 | 4/1987 | Ditscheid et al. . |
| 4,691,896 | 9/1987 | Reeve et al. . |
| 4,702,404 | 10/1987 | Einsle . |
| 4,756,510 | 7/1988 | Klamm ........................... 254/134.4 |
| 4,796,970 | 1/1989 | Reeve et al. . |
| 4,856,760 | 8/1989 | Frost et al. ...................... 254/134.4 |
| 4,948,097 | 9/1990 | Reeve et al. . |

FOREIGN PATENT DOCUMENTS

| | | |
|---|---|---|
| 37076 | 5/1968 | Australia . |
| 0108590 | 5/1984 | European Pat. Off. . |
| 0318280 | 5/1989 | European Pat. Off. . |
| 0323028 | 7/1989 | European Pat. Off. . |
| 1934818 | 1/1971 | Fed. Rep. of Germany . |
| 2507583 | 9/1976 | Fed. Rep. of Germany . |
| 3000109 | 7/1980 | Fed. Rep. of Germany . |
| 3409376 | 2/1985 | Fed. Rep. of Germany . |
| 3340972 | 5/1985 | Fed. Rep. of Germany . |
| 2577724 | 8/1986 | France . |
| 40-9359 | 4/1983 | Japan . |
| 1511615 | 5/1978 | United Kingdom . |
| 2081764 | 1/1982 | United Kingdom . |
| 2086607 | 5/1982 | United Kingdom . |
| 2119949 | 6/1983 | United Kingdom . |
| 2122367 | 1/1984 | United Kingdom . |
| 2122370 | 1/1984 | United Kingdom . |
| 2212940 | 3/1984 | United Kingdom . |
| 2157019 | 10/1985 | United Kingdom . |

OTHER PUBLICATIONS

S. A. Cassidy et al., "A Radically New Approach to the Installation of Optical Fibre Using the Viscous Flow of (List continued on next page.)

Primary Examiner—RObert C. Watson
Attorney, Agent, or Firm—Nixon & Vanderhye

[57] ABSTRACT

An apparatus and method for introducing a transmission line (5) into a duct (1) through which it is to be propelled by viscous drag of a fluid propellant. A high local flow of fluid is created by inputting fluid, preferably compressed air, adjacent the input of the transmission line to the duct and bleeding a proportion of the fluid from the duct a short distance along from the input. This local flow provides the driving force to progress the transmission line along the first third of the duct against the hydrostatic potential. The extent of the venting via the bleed valve is controllable to control the driving force on the transmission line (5). This technique is especially useful for transmission lines including optical fibres.

21 Claims, 2 Drawing Sheets

OTHER PUBLICATIONS

Air", Telecom Technol J., vol. 2 Bi 1, Jan. 1984, pp. (4 pp.).
"Sub-ducts: The Answer to Honolulu's Growing Pains" by Herman S. L. Hu and Ronald T. Miyahara, Apr. 7, 1980, pp. 23-35.
"Single-Ended FIber Strain & Length Measurement on Frequency Domain", by Kashyap and Reeve, Electronic Letters, vol. 16, No. 18, Aug. 1980.
"Temperature Desensitization of Delay in Optical Fibers for Sensor Applications" by Kashyap et al., Electronics Letters, vol. 19, No. 34, Nov. 1983.
"Optical Fibre Jacketed with Electronics Lett", vol. 19, No. 17 8/83, pp. 674-675, Yamamoto et al.
"High Quality Optical Fibre Cable for Telecommunication" Conf. 27th Int. Wire & Cable Sym. Cherry Hill, N.J. 11/78, pp. 394-403 by Pizzorno.
"Principles of Fiber-Optical Cable Design", IEEE vol. 123, No. 6, Jun. 1976, pp. 597-602, by Foord et al.
"Method of Introducing a Linear Body Into a Winding Tube" by Asano, Sep. 1987-No. 4468, pp. 1-4.

OPTICAL FIBRE INSTALLATION

This invention relates to transmission lines and to the introduction of a transmission line into a duct through which it is to be advanced by fluid drag.

Our European Patent 108590 discloses a method and apparatus for installation of transmission lines within tubular ducts using fluid drag to advance the transmission line along the duct. In the preferred form of apparatus described in that specification compressed gas is used to provide the fluid drag and an optical fibre transmission line package is introduced via a feed head and feed wheels are provided to urge the fibre package into the duct against the hydrostatic potential that is experienced. Once a sufficient length of the fibre package has been inserted the fluid drag on the inserted fibre overcomes the resistance of the hydrostatic potential and the fibre is propelled by fluid drag along the duct. During such an installation procedure there is . substantially continuous relative motion between the duct and the fibre package.

For in-field applications it is desirable to have mobile equipment that can easily be moved from location to location, and can be utilised in confined spaces: this is particularly important for repair work which may have to take place in remote and awkward circumstances. With the apparatus described in E. P. 108590 it has been found that the feed wheels and associated drive mechanism limits the minimum size of the equipment.

A further problem that arises with positive pressure feed heads is the provision of a seal to inhibit backflow of fluid between the inlet tube for the fibre package and the fibre package itself. It is necessary for the fibre to be able to advance without being over-tensioned, but at the same time the greater than atmospheric pressure within the feed head needs to be maintained. Sealing may be particularly difficult to achieve because there can be a considerable variation in cross-sectional shape and diameter of some transmission line packages, for example the tolerance on the diameter of a multi-fibre package maybe as much as ±10%. Thus if a very closely fitting collet is located around the fibre package the positive deviations in diameter may result in the package being gripped too tightly, resulting in excessive tension on the optical fibre. In practice an inefficient sealing arrangement of a collet of greater diameter than the package and sufficient to accommodate the package cross sectional variation is used, and this results in fluid propellant leakages as high as 50% occurring between the fibre and collet.

The present invention is directed towards advancing transmission lines in installation passageways, to reduce or eliminate the need for mechanical advancement, and/or to achieving greater installation distances.

Accordingly the present invention provides apparatus for advancing a transmission line along a tubular installation passageway having a transmission line input end and a transmission line output end by viscous drag of a fluid medium, the apparatus comprising an input for the transmission line, inlet means for admitting fluid medium to the installation passageway and at least one outlet means disposed downstream of the inlet means for discharging fluid medium substantially before the transmission line output end of the installation passageway.

The invention also provides a method of advancing a transmission line into an installation passageway by the viscous drag of a fluid medium, the installation passageway having a transmission line input and a transmission line output end, the method comprising the steps of admitting fluid medium to the passageway containing the transmission line and discharging fluid medium from the passageway through an outlet further along the passageway in the direction of advancement of the transmission line but substantially before the transmission line output end of the installation passageway.

The invention is now described by way of example with reference to the accompanying drawing in which:

FIG. 1 schematically illustrates an embodiment of the invention;

In the context of this specification transmission line 'package' should be interpreted to mean any transmission line adapted for or suitable for installation by fluid drag techniques, and may for example comprise a simple transmission line, transmission lines comprising at least one optical fibre, or transmission lines having a lightweight or foamed covering for the purpose of increasing surface area to mass ratio. Such a covering may also provide suitable drag and friction characteristics and ruggedisation of the transmission line.

'Installation duct' or 'installation passageway' refers to the routes along which transmission lines are installed, such routes may for example be within buildings or over or underground, and frequently contain bends.

Figure 1:
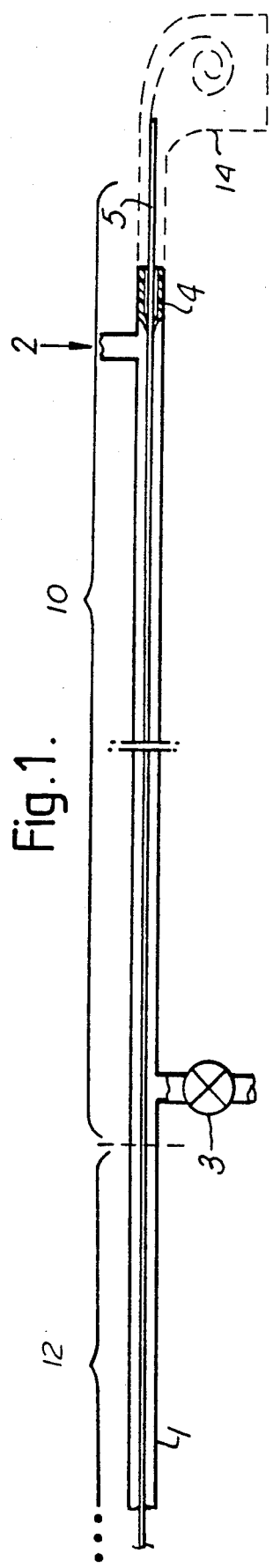

In FIG. 1 a tubular duct 1 is provided with a fluid inlet 2, which may be for gas or liquid but it is especially preferred to utilise compressed air and is described hereinafter in that context, a bleed valve 3 and a seal 4. The inlet 2 is located close to the end of the duct to which a transmission line package such as an optical fibre package 5 is input, and the seal 4 has a passage for the fibre package 5 and seals against the duct 1 and the fibre package 5. The bleed valve is located a short distance (compared with the overall length of duct) from the fibre input end, typically 0.5 to 3 meters from the input end.

In order to commence the installation operation, referred to as the blowing operation, the fibre package is threaded through the seal, urged a short way into the duct and then compressed air is introduced via the inlet. With fibre blowing systems it is generally necessary to urge the fibre package into the duct against hydrostatic potential created by introduction of compressed air until the package is inserted along about one third of the length of the duct, after which the fibre is propelled by viscous drag. Previously the fibre package has been pushed for this first one third of the duct by motor driven wheels. In this embodiment of the invention compressed air (typically at a pressure of about 1000KPa (10 bar) is introduced at the inlet, but instead of all the air progressing completely through the duct a proportion (for example up to 80%) is bled off through the bleed valve to create a high local flow between the fibre input and the bleed valve. This high local flow produces sufficient driving force to push the fibre along the first third of the duct against the hydrostatic potential. Preferably the bleed valve is adjustable and the proportion of air bled through the valve is reduced as the fibre package progresses along the first third of the duct. A control means may be included which senses tension or buckling of the fibre package, and this control may be linked to increase or decrease the level of discharge through the bleed valve.

The length of duct between the fibre input and the bleed valve may be regarded as a short duct 10 connected directly to a longer duct 12, and it is envisaged that the duct prior to the bleed valve need not be integral with the main part of the duct after the bleed valve. It will be realised that the blown feed-in may be applied directly to the end of an installed duct, this being achieved either by tapping into the duct to provide the compressed air inlet and bleed valve or by attaching a length of ducting provided with an air inlet and bleed valve.

Figure 4:
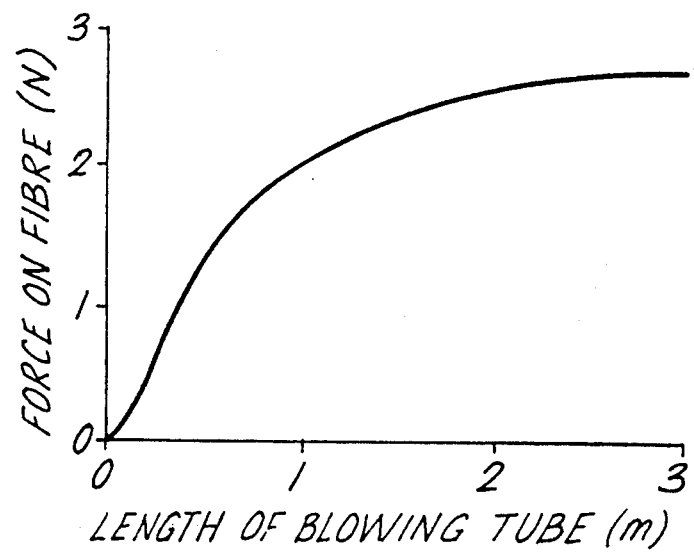
FIG. 4 is a graph showing force on a transmission line against distance to a bleed valve.

It has been found in practice, and is shown in FIG. 4, that the relationship between the force that can be imparted on a fibre package and the length of the blowing tube between the air input and the vent is non-linear, and that utilising a length in the range of 1 to 2 meters is optimal: increasing the length much beyond 1.5 meters gives little additional benefit. The optimum bore diameter for the tube between the input and the bleed valve is that bore that will just maintain the output of the source or compressor at a maximum or selected value. For a 1.5 meter distance to the bleed valve and a compressor capacity of 370L/minute it has been found that a bore of 3.8 mm is optimal: below this the bore restricts the compressor output and above this the compressor capacity is insufficient. Installation speeds in excess of 100 meters per minute, and in general in the range of 50 to 100 meters per minute can be achieved with such a blown feed.

An alternative embodiment of the invention (not shown) is for a vent to be located a substantial distance along the duct, for example at the mid point or two thirds of the way along, and for air to be bled from that vent until the transmission line has approached close to it, at which time the vent is then closed. In effect such a vent may be considered a 'temporary termination' of the duct. A series of vents that are sequentially opened and closed as the transmission line advances may also be provided. Optimally this is used in conjunction with a blown feed-in, but may be utilised with other feed-in mechanisms to improve continuous installation lengths. For very long installations the flow rate of the air may be increased by employing suction at vent locations, or additional air may be injected into the duct at intermediate locations (i.e. other than at the end) along the duct, preferably with an associated subsequent vent.

When compressed air is introduced at the end of an installation duct, it is necessary to prevent excessive backfow of air out of the duct. This may be done by restricting the passage for backflow of air by provision of narrow outlets or seals around the transmission line input. Alternatively the fibre package may be paid out from a closed unit 14 that can be sealed to the duct.

Figure 2:
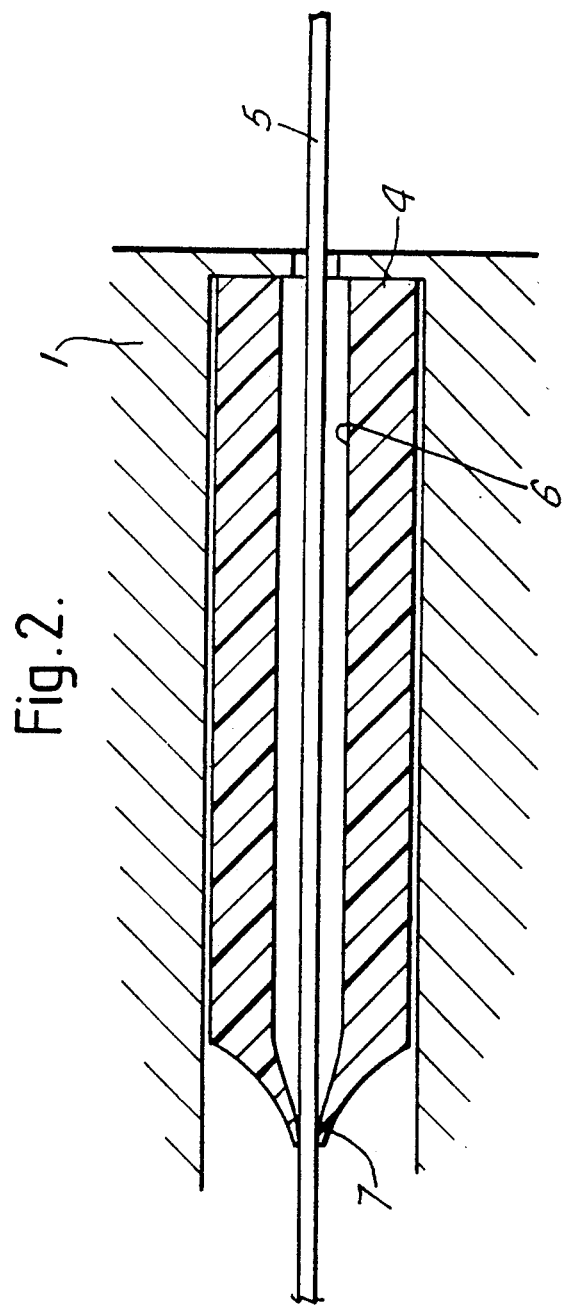
FIG. 2 shows a preferred form of seal for a transmission line entry point in the embodiment of FIG. 1.

FIG. 2 illustrates in more detail the seal 4 through which the fibre package is threaded. This seal enables the fibre package to be introduced from an open source such as a reel or pan of fibre package. The seal 4 is substantially cylindrical and has a central bore 6 through which the fibre 5 is threaded. For most of its length the bore 6 is of greater diameter than the fibre 5 so that the fibre can pass freely through the bore. At the end of the seal inwardly of the tube 1 the bore of the seal tapers to closely match the diameter of the fibre 5 and the wall thickness of the seal also tapers to form a lip portion 7 closely surrounding the fibre 5. Due to the thinning of the wall of the seal there is only light resistance to the passage of fibre through the seal, and at the same time the pressure within the tube also tends to press the lips of the seal onto the fibre to form an airtight seal. Suitable choice of material hardness and dimensions enable the pressure on the lips of the seal from the compressed air to be sufficient to permit the lips to adapt to the configuration of the fibre package as it moves longitudinally through the seal so as to reduce escape of air backwards along the fibre package while at the same time presenting only slight resistance to movement of the fibre package through the seal.

If the material of the seal is too flexible the pressure can cause the fibre to be gripped too tightly. The gripping effect is minimised by keeping the area of contact between the fibre package and the seal small, just at the tip of the lips, and lubricants or low friction coatings may also be used. However, a further problem with too flexible material is that the lips can become inverted, that is blown inwardly of the seal, when high blowing pressures are used. Suitable plastics include Hyperlast 2851/106, a polyurethane elastomer supplied by B and T Polymers and PVCs such as VX329 made by British Plastics Industry Ltd. Other VX types of PVC and Alkathene (made by ICI) may also be used, but presently VX329 is preferred for its performance and the simplicity of injection moulding which is possible for PVC. Cold setting materials are not as convenient for large scale production although suitable final properties may be obtained.

The optimum shape for the lips of the seal, to minimise contact area and prevent inversion, is for the internal bore to be tapered so that the tip of the lips nearly or just contact the fibre package: it is possible for there to be virtually no contact in the absence of pressure. The outer surface of the lips (which face inwardly of a feed head) are tapered such that at the point of contact the material is very thin. This provides sufficient flexibility to enable the pressure inside the head to urge the lips into sealing contact. In order to avoid inversion the angle of taper is large to retain strength against inversion. It has been found that for an optical fibre transmission line comprising seven fibres (or possibly five fibres and two electrical conductors) enclosed in a low density coating suitable for fibre blowing and having an average diameter of 2 mm, BPI VX329 grade PVC provides a suitable seal when the minimum inside diameter of the lip portion of the seal is 2 mm and the outer diameter of the lip portion is 2.9 mm. This seal operates well in the range of 300 to 1300KPa. For thinner transmission line packages a seal of similar material and outer dimensions but lesser internal diameter, e.g. 1.6 mm for 1.6 mm packages, is also satisfactory. For very thin or delicate fibre packages the seal may be made of softer material, for example for a single fibre package, and this may be complemented by using a lower air pressure. Alternatively a plurality of thin packages may be passed through the same bore and installed simultaneously. The outside diameter of the main body of the seal is preferably in the range of 6 to 10 mm, or less. It is envisaged that seal of this type may also be used for other applications where a moving fibre unit or package needs to be sealed across a pressure differential. In particular the seal may be incorporated into other types of feedheads for fibre blowing to reduce leakage. Multi bore or manifold seals may also be provided for multiple installations.

The apparatus and method described herein may be used for installation of transmission lines other than the described optical fibre packages and in some instances a special packaging may not be required. The transmission line may comprise metallic conductors or metallic conductors may be included in an optical fibre package for fluid drag installation. A plurality of transmission lines may be installed in a single duct, either sequentially or in the same blowing operation. Pulsed fluid input and/or pulsed venting may be utilised; in particular pulsed venting, with the pulse rate controlled to increase or decrease the degree of venting, may be utilised in an automatically controlled system, for example with an electrically pulsed bleed valve.

Figure 3:
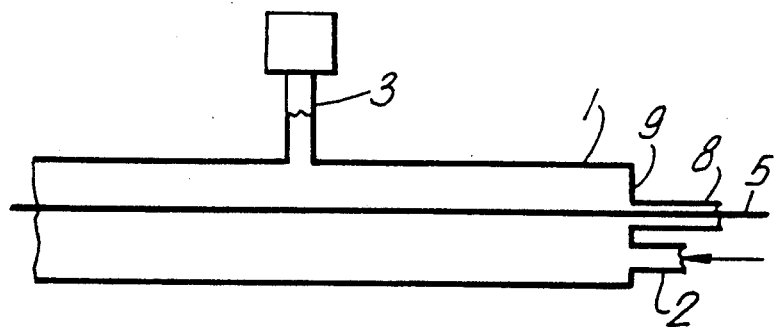
FIG. 3 shows an alternative embodiment of the invention.

Although the provision of the seal 4 renders the apparatus more efficient in terms of eliminating backwards leakage of air along the fibre, the fibre may be introduced to the duct via a closely fitting tube 8 attached to an end plate 9 as shown in FIG. 3.

It is found that fibre packages exhibit a varying degree of 'blowability', that is some nominally similar packages achieve greater installation distances under the same blowing conditions than other packages. A technique for measuring the blowability is for the fibre to be blown along a short duct and for a retarding force to be applied, the force registered for a given blowing strength or the blowing strength required for a given force being measured to indicate blowability. Such a system may be incorporated on a production line to grade or quality conrol the package. The apparatus for this test may comprise a blow and vent arrangement, although the vent may be constituted by the end of the tube. Similar testing may be applied using a liquid fluid medium.

What is claimed is:

1. Apparatus for installing a transmission line in a passageway by means of viscous drag of a fluid, so that the transmission line extends between a transmission line inlet to the passageway and a transmission line outlet remote from the inlet, the apparatus comprising:
    fluid inlet means for admitting fluid to the passageway at sufficient pressure to advance the transmission line along the passageway by viscous drag forces generated between the transmission line and fluid passing relative thereto, and
    fluid outlet means downstream from the fluid inlet means, but a substantial distance upstream of the transmission line outlet,
    said fluid outlet means being adapted to discharge a portion of the admitted fluid from the passageway, but, in use of the apparatus, for sufficient fluid to remain to continue to advance the transmission line along the passageway by means of viscous drag forces until it reaches the transmission line outlet.

2. Apparatus as in claim 1, wherein said fluid inlet means and said fluid outlet means are included with an introductory passageway portion adapted to be connected to said transmission time inlet of said passageway in which a transmission line is to be installed.

3. Apparatus according to claim 1 or 2 in which at least one of the fluid inlet means and fluid outlet means is provided directly into the passageway.

4. Apparatus according to claim 1 or 2 comprising a second fluid outlet means downstream of said fluid outlet means and arranged to be opened or closed depending on the distance which the transmission line has advanced into the passageway.

5. Apparatus according to claim 1 or 2 comprising means for inhibiting backflow of fluid towards the transmission line inlet.

6. Apparatus according to claim 1 or 2, including a sealed unit containing the transmission line, wherein the transmission line can be introduced to their passageway from the sealed unit.

7. Apparatus for installing a transmission line in an installation passageway substantially longer than 3 meters by means of viscous drag of a fluid exerted within the passageway on said transmission line as the fluid moves relative thereto, so that the transmission line extends between a transmission line inlet to the passageway and a transmission line outlet remote from the inlet, the apparatus comprising:
    a tubular duct substantially shorter than said installation passageway and having a transmission line inlet end and a transmission line outlet end for connection to said transmission line inlet of the installation passageway;
    fluid inlet means for admitting fluid to the duct;
    fluid outlet means disposed between fluid inlet means and said transmission line outlet end of the tubular duct to permit said fluid to flow through the passageway relative to said transmission line; and
    a closed unit holding a supply of transmission line, the transmission line inlet of the duct being sealed to the unit from whence the transmission line may be paid out.

8. Apparatus for installing a transmission line in an installation passageway substantially longer than 3 meters by means of viscous drag of a fluid exerted within the passageway on said transmission line as the fluid moves relative thereto, so that the transmission line extends between a transmission line inlet to the passageway and a transmission line outlet remote from the inlet, the apparatus comprising:
    a tubular duct substantially shorter than said installation passageway and having a transmission line inlet end and a transmission line outlet end for connection to said transmission line inlet of the installation passageway;
    fluid inlet means for admitting fluid to the duct;
    fluid outlet means disposed between said fluid inlet means and said transmission line outlet end of the tubular duct to permit said fluid to flow through the passageway relative to said transmission line; and
    means for inhibiting backflow of fluid medium towards the transmission line inlet end of the duct wherein, in use, fluid passes from the transmission line outlet end of the duct into said passageway, whereby the transmission line is advanced by viscous drag of the fluid within said passageway.

9. Apparatus according to claim 8, in which the transmission line inlet comprises a restriction adapted to reduce escape of fluid from the inlet.

10. Apparatus according to claim 9 in which the restriction comprises a resilient plug having a bore for the passage of the transmission line and an extended lip portion surrounding the transmission line in the passageway so that pressure from the fluid urges the lip portion to seal against the transmission line.

11. Apparatus as in claim 1 or 8, comprising fluid inlet and outlet means located at an upstream end of an installation passageway, and at least one further fluid inlet means and fluid outlet means located further downstream.

12. Apparatus as in claim 1 or 8 in which the transmission line inlet end of the passageway is continuous with the transmission line outlet of a preceding installation passageway.

13. Apparatus as in claim 1 or 2 wherein the fluid outlet means is located a short distance from the transmission line inlet compared to the length of the passageway.

14. Apparatus according to claim 1 or 2 in which the inlet for the transmission line and the fluid inlet means are provided at the same location, or in closed proximity.

15. Apparatus for installing a transmission line within and along a tubular passageway having first and second ends, said apparatus comprising:
- a hollow duct having a fluid inlet,
- a first fluid outlet in fluid communication with said duct and disposed downstream of said fluid inlet;
- a second fluid outlet adapted for the fluid communication with said first end of the passageway; and
- a transmission line inlet to said duct proximate said fluid inlet;

whereby, in operation, fluid supplied to said fluid inlet flows downstream within said duct and passes out both said first and second fluid outlets and thence along said passageway while flowing downstream relative to a transmission line caused to advance therewithin from the line inlet due to viscous drag forces generated between the line and the fluid flow, said relative flow being greater at locations between said fluid inlet and said first fluid outlet than at locations downstream of said first fluid outlet to thus generate increased viscous drag forces upstream of said first fluid outlet.

16. Apparatus as in claim 15 wherein said duct is separable downstream and proximate to said first fluid outlet from said tubular passageway, said duct comprising a removable portable apparatus that can be used, in situ, to install said transmission line within permanently installed conduits which constitute said tubular passageway.

17. Apparatus as in claim 15 or 16 further comprising at least one further fluid outlet in fluid communication with said passageway and disposed downstream from said first fluid outlet.

18. Apparatus as in claim 15 or 16 wherein said first fluid outlet includes a control valve for controlling the fluid flow passing therethrough.

19. Apparatus as in claim 15 or 16 comprising a sealable orifice at said transmission line inlet which is flexible and shaped to be sealed against incoming transmission line by the pressure of said fluid within the duct.

20. Apparatus as in claim 15 or 16 further comprising a sealed transmission line supply unit sealingly connected to said transmission line input and adapted to contain a supply of said transmission line for feeding thereinto.

21. Apparatus as in claim 15 or 16 wherein the distance between said fluid inlet and said first fluid outlet is no more than three meters.

* * * * *